*Philip H. Wiedersum.*
*Harness Saddle Tree.*

116518

PATENTED JUN 27 1871

Witnesses
John A Ellis
J. V. White

Inventor
Philip H. Wiedersum
Per,
T. H. Alexander
Atty

UNITED STATES PATENT OFFICE.

PHILIP H. WIEDERSUM, OF NEW YORK, N. Y.

IMPROVEMENT IN HARNESS SADDLE-TREES.

Specification forming part of Letters Patent No. 116,518, dated June 27, 1871.

*To all whom it may concern:*

Be it known that I, PHILIP H. WIEDERSUM, of New York, in the county of New York and State of New York, have invented certain new and useful Improvements in Harness Saddle-Trees; and I do hereby declare that the following is a full, clear, and exact description thereof, reference being had to the accompanying drawing and to the letters of reference marked thereon, which form a part of this specification.

The nature of my invention consists in the construction and arrangement of a saddle-tree, as will be hereinafter more fully set forth.

In order to enable others skilled in the art to which my invention appertains to make and use the same, I will now proceed to describe its construction and operation, referring to the annexed drawing, in which—

Figure 1:
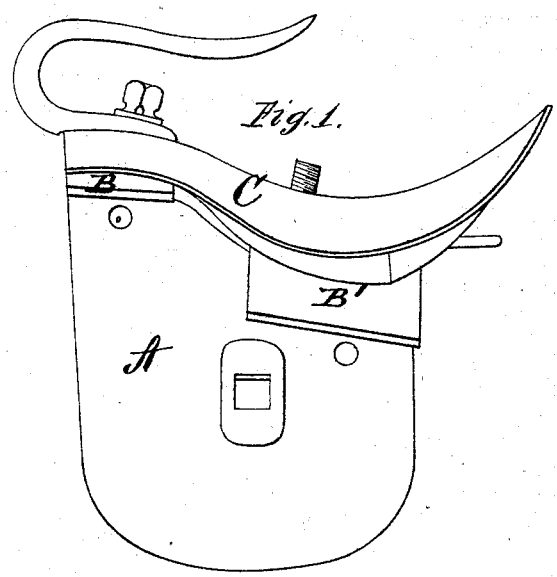
Figure 2:
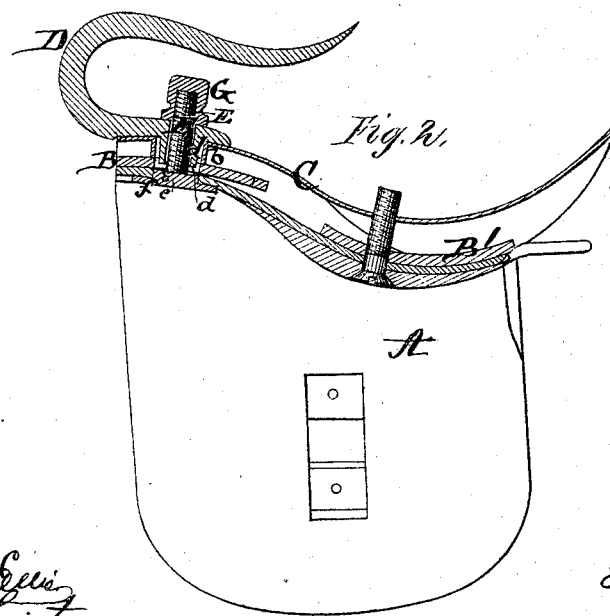

Figure 1 is a side view, and Fig. 2 a transverse vertical section of my saddle.

A represents the saddle-tree, the sides of which are made perfectly straight, with suitable holes for riveting or tacking the leather and for other purposes. Square boxes are also formed with square holes in the under side of the tree, said boxes being made so that the upper surface of the tree will be as smooth and even as possible. The center of the tree is raised, and on the same are secured two pieces of leather, B and B', the rear piece B' extending further down than the front piece B. In the under side of the tree, at the front edge, in the center, is formed a square box with a square hole through the tree, and in the leather B is cut a square hole corresponding in size with the hole in the tree. In the front end of the saddle C is a corresponding hole, and from the under side thereof projects a square boss, *b*. D represents the check-hook, provided on the under side with a square boss, *d*, which is inserted from above and fits in the square hole and boss of the saddle. E is a screw provided with a square head, *e*, and square plate *f*, and is inserted from underneath through a hole in the boss *d* and hook D, the plate *f* fitting in the box on the under side of the tree, and the head *e* in the square holes of the tree and leather. A nut, G, of any desired shape, is then screwed on the upper end of the screw E, which firmly holds the check-hook in place, and, at the same time, prevents the check-rein from slipping off of the hook. The same mode of fastening may be applied to terrets or other parts of the saddle.

Having thus fully described my invention, what I claim as new, and desire to secure by Letters Patent, is—

The combination, with a saddle and tree having square holes, as described, of the hook D with square boss *d*, the screw E with square head *e* and square plate *f*, and the nut G, all constructed and arranged substantially as and for the purposes herein set forth.

In testimony that I claim the foregoing as my own I affix my signature in presence of two witnesses.

PHILIP H. WIEDERSUM.

Witnesses:
T. H. ALEXANDER,
J. V. WHITE.